July 25, 1950  D. BARKSCHAT  2,516,540
FRUIT PICKER
Filed May 29, 1946  3 Sheets-Sheet 2
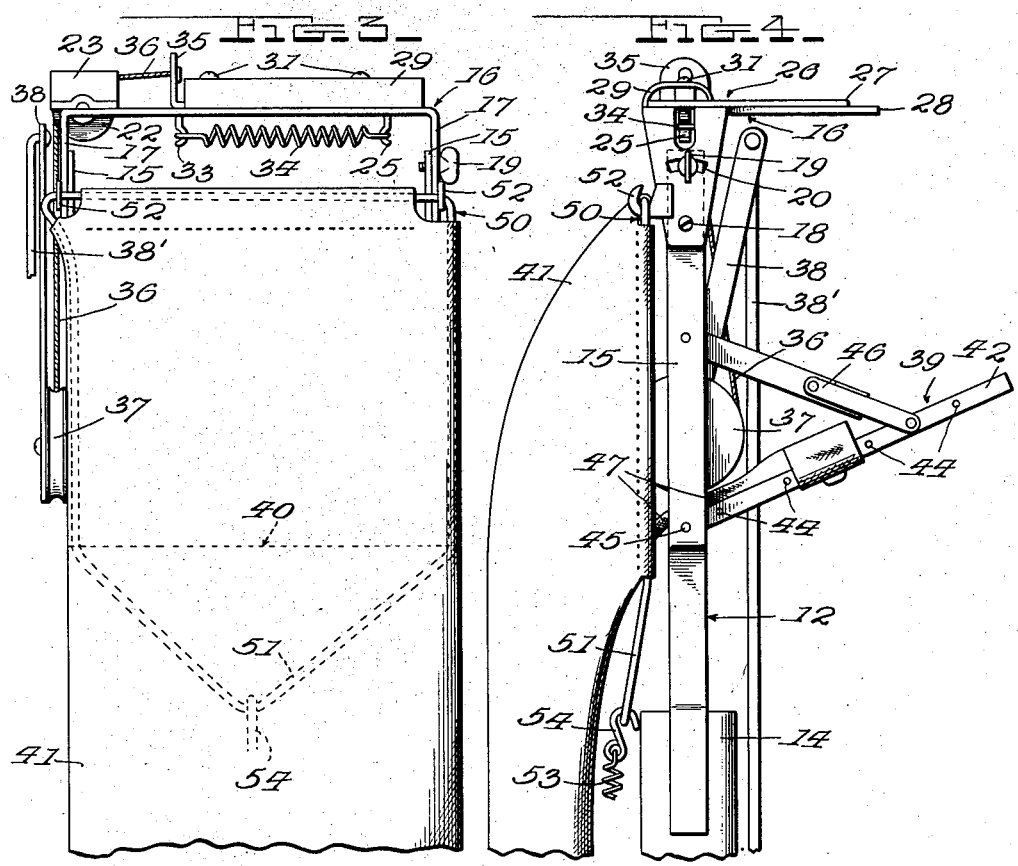
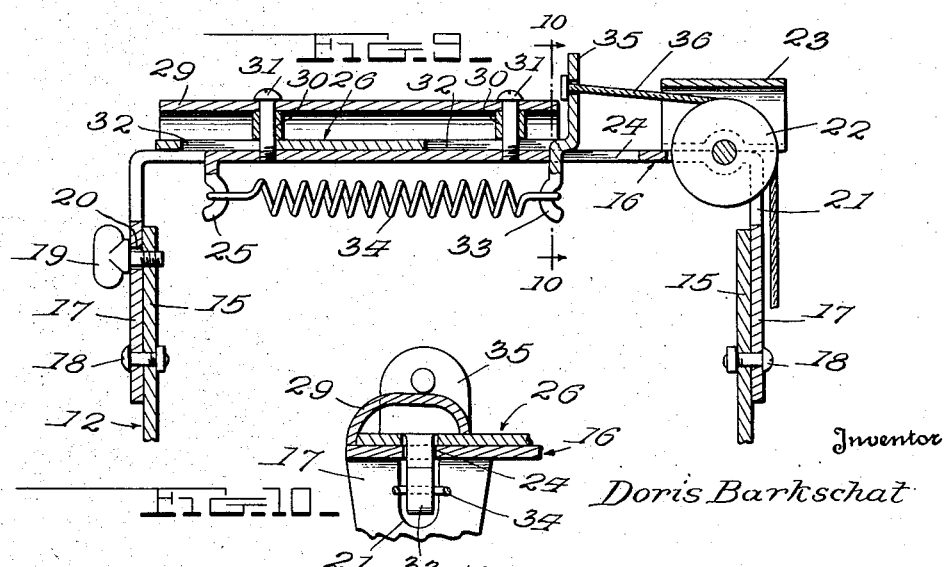
Inventor
Doris Barkschat July 25, 1950 D. BARKSCHAT 2,516,540
FRUIT PICKER
Filed May 29, 1946 3 Sheets-Sheet 3
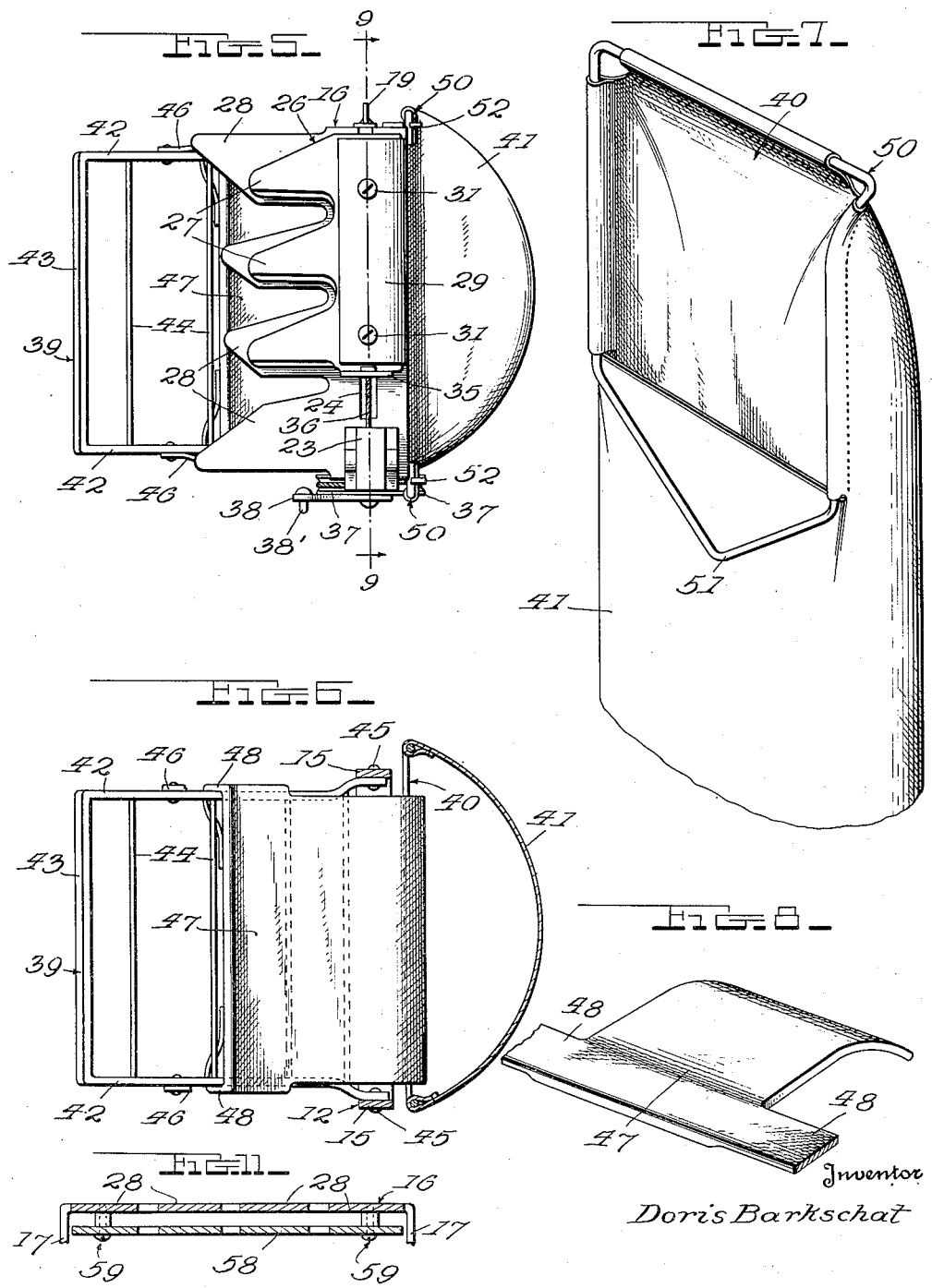
Inventor
Doris Barkschat
By
H.B.Wilson & Co. Attorney Patented July 25, 1950

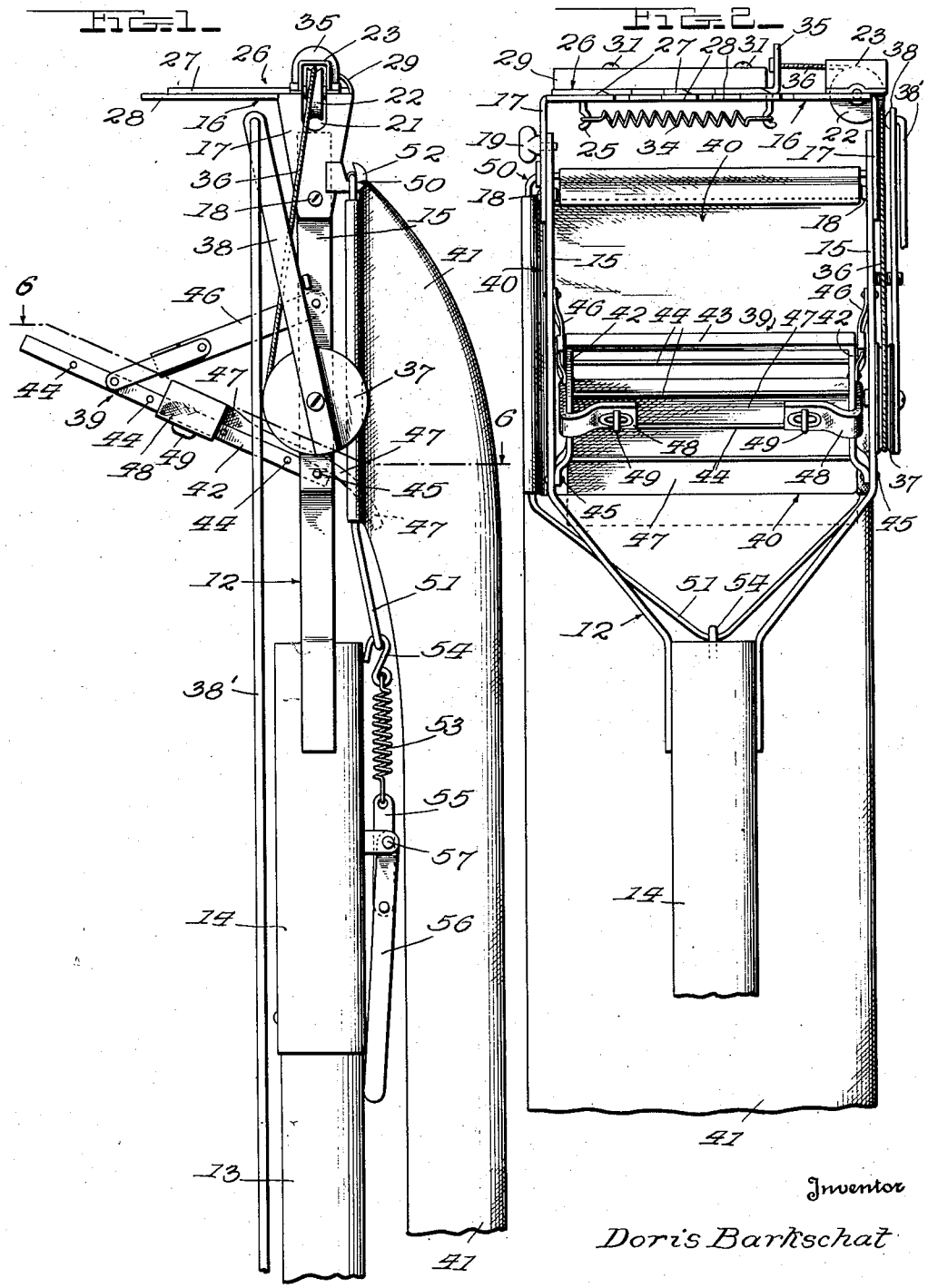

2,516,540

UNITED STATES PATENT OFFICE 2,516,540

FRUIT PICKER

Doris Barkschat, Beverly Hills, Calif.

Application May 29, 1946, Serial No. 673,066

5 Claims. (Cl. 56—338)

The invention relates to fruit pickers of the general type in which a stem-cutting mechanism is mounted on a frame projecting upwardly from a pole, and the principal object of the invention is to provide a new and improved picker which allows the fruit to be more readily seen and more easily engaged by the cutting mechanism, saving a great deal of troublesome and tiresome head and arm movements and maneuvering of the picker to first see the fruit and then engage the cutting mechanism with it.

In carrying out the above end, a further object is to provide a novel openwork fruit catcher under the cutting mechanism to receive the cut fruit and guide it to a flexible tube through which it descends as usual, the openwork nature of said fruit catcher preventing it from obstructing the vision of the person using the picker.

Another object is to provide a novel means to prevent bruising of the cut fruit when it falls onto said fruit catcher.

A still further object is to provide novel and advantageous means for detachably connecting the fruit-receiving and conducting tube to the frame.

Another object is to make novel provision for cutting the fruit stems either close to the fruit or relatively distant from it, as desired.

Still another object is to provide for adjusting the cutting mechanism into different angular relations with the pole, for the convenience of the operator.

Still another object is to provide a novel construction which allows movement of the fruit catcher to an ineffective position to provide a compact structure for shipment or storage, or to permit the use of the picker for pruning.

Yet another object is to provide a simple, light, and inexpensive construction, yet one which will be efficient and durable.

Figure 1 is a side elevation, partly broken away, showing the improved picker.

Figure 2 is a front elevation.

Figure 3 is a fragmentary rear elevation.

Figure 4 is a fragmentary side elevation showing the side opposite that illustrated in Fig. 1.

Figure 5 is an upper end view.

Figure 6 is a horizontal section substantially on line 6—6 of Fig. 1.

Figure 7 is a perspective view of the upper end of the fruit-receiving and conducting tube.

Figure 8 is a fragmentary perspective view of the pad which is applied to the fruit catcher.

Figure 9 is an enlarged vertical section on line 9—9 of Fig. 5.

Figure 10 is a transverse section on line 10—10 of Fig. 9.

Figure 11 is a detail vertical section showing a gauge which may be applied to the fixed cutter when the fruit is to be cut with long stems.

A preferred construction has been illustrated and will be rather specifically described, with the understanding, however, that within the scope of the invention as claimed, variations may be made.

A vertical frame 12 is secured to and projects upwardly from a pole 13, said frame comprising a ferrule 14 and two arms or side bars 15 secured to the upper end of said ferrule and disposed vertically in laterally spaced relation. A fixed cutter 16 extends between the upper ends of the arms 15 and is provided with downwardly bent ends or arms 17 which lie against said bars or arms 15 and are pivoted thereto at 18 on transversely alined pivots to permit forward or rearward swinging for the purpose of disposing the cutter 16 in any selected angular relation with the frame 12 and pole 13, for the convenience of the operator. A thumb screw 19 extends through a slot 20 in one of the downwardly projecting cutter ends 17 and is threaded through one of the arms 15 for clamping the cutter 16 in adjusted position. One end of the fixed cutter 16 and the contiguous portion of the adjacent arm 17, are slotted at 21 and a small sheave 22 is mounted in the slot, an appropriate guard hood 23 being secured to said cutter end to encase the upper portion of said sheave. In inwardly spaced relation with the sheave 22, the cutter 16 is formed with a longitudinally extending slot 24, and toward the other end of said cutter 16, a finger 25 is stamped downwardly.

A reciprocatory cutter 26 rests slidably upon the cutter 16, said cutters 26 and 16 being provided with cooperable forwardly projecting fingers 27 and 28 respectively. An arched plate 29 extends longitudinally over the rear portion of the cutter 26, spacing sleeves 30 are interposed between the upper portion of this arched plate and said cutter 26, and screws 31 pass through said arched plate and said sleeves and are threaded into the fixed cutter 16, the cutter 26 being formed with longitudinal slots 32 through which said screws 31 extend. At the end of the cutter 26 toward the sheave 22, there is a downwardly stamped finger 33 which is connected by a coiled tension spring 34 with the finger 25, said spring serving to return the cutter 26 to the position of Fig. 5, each time it is pulled in cutting direction and released. The end of the cutter 26 having the finger 33, is provided also with an upwardly bent lug 35. To this lug, one end of a cable 36 is connected, said cable extending over the sheave 22 and being suitably connected with a grooved pulley 37 which is mounted on one of the frame arms 15. This pulley is provided with an actuating arm 38 from which a rod or the like 38' extends downwardly to an appropriate handle (not shown) on the lower end of the pole 13. Obviously, a downward pull on the rod or the like 38' will turn the pulley 37, thus pulling upon the cable 36 to operate the movable cutter 26. It will be seen that the parts 16 and 17 form an inverted U-shaped supporting and adjusting member for the stem-cutting mechanism and that the pivots 18 and clamping screw 19 will permit angular adjustment of that mechanism with respect to the frame.

An openwork fruit catcher 39 projects forwardly from the frame 12 under the cutting mechanism and is declined toward said frame to direct the fruit through an opening 40 in the upper end of a flexible tube 41 which downwardly conducts the fruit in the usual way. The fruit catcher 39 comprises parallel side bars 42 connected at their outer ends by an end bar 43 and connected at suitable intervals by transverse wires 44. The lower ends of the side bars 42 are pivoted at 45 to the arms 15 to permit upward swinging of the fruit catcher 39 to an inactive position to provide a more compact structure for storage or shipment. Obviously when the catcher is folded the cutting mechanism may be used for pruning, if desired. Suitable foldable inclined braces 46 connect the front portions of the side bars 42 with the arms 15 of the frame 12 and normally form side guards for the fruit catcher. These braces, of course, "buckle" upwardly when the catcher 39 is to be swung to an inactive position when the device is to be transported or stored away.

While the front portion of the fruit catcher 39 is left unobstructed for clear vision, the rear portion of said catcher is preferably covered with an appropriate pad 47 to prevent bruising of the cut fruit as it drops from the cutting mechanism, the rear end of said pad preferably extending into the opening 40. To secure the pad 47 in place, its front portion is provided with tabs 48 folded downwardly and inwardly around the side bars 42 of the fruit catcher 39, said tabs being secured against the lower side of the pad 47 by curtain fasteners or the like 49.

The tube 41 is provided with a wire frame 50 suitably secured thereto along the vertical and upper edges of the opening 40, the lower end 51 of said frame being exposed at the front side of said tube 41 and being preferably V-shaped. The upper corners of the frame 50 are also exposed and these corners are detachably engaged with the hooks 52 secured to the downturned ends 17 of the fixed cutter 16. A tension spring 53 is detachably connected with the lower end 51' of the frame 50, by means of a hook 54, the lower end of said spring 53 being connected with the upper end of a link 55, which link is suitably connected with a hand lever 56 fulcrumed at 57 on the ferrule 14. It will be seen on reference to Fig. 1 that the lower end of link 55 is pivoted to lever 56 at a point spaced downwardly from its pivot 57. When this lever 56 occupies the past-dead-center-position of Fig. 1, it holds the spring 53 under tension and thus holds the frame 50 effectively engaged with the hooks 52. When the lever 56 is swung upwardly, the spring 53 is released and may be unhooked from the lower end 51 of the frame 50, permitting unhooking of the latter from the hooks 52. This detachment of the frame and the tube 41 connected therewith, is advantageous, not only for cleaning the latter, but when the device is to be used for pruning instead of fruit picking.

The manner of using the improved picker will be obvious and it will be apparent that it not only gives excellent visibility but permits easy engagement with the fruit stems without the customary maneuvering of the picker, accompanied by troublesome and tiresome head and arm movements. When the fruit is to be cut with short stems, the cutter 16 of course rests directly on the fruit, but if long stems be required, a gauge plate 58 of substantially the same shape as the fixed cutter 16, may be suitably mounted at 59 under said fixed cutter, as seen in Fig. 11, thus so spacing the cutting mechanism above the fruit, as to provide the latter with the required long stems.

From the foregoing, taken in connection with the accompanying drawings, it will be seen that novel and advantageous construction has been provided for carrying out the objects of the invention, and while preferences have been disclosed, attention is again invited to the possibility of making variations within the scope of the invention as claimed.

I claim:

1. In a fruit picking device having a pole, a fruit receiving tube and means for cutting the stems of fruit and directing the cut fruit into the tube, said means comprising an upright frame disposed in the plane of a pole above the top thereof and including parallel side bars, a manually-actuated stem-cutting mechanism connected straight across the tops of said side bars and projecting forwardly from said frame in a plane substantially perpendicular thereto, and a substantially rectangular, openwork fruit catcher disposed in a downwardly and rearwardly inclined position beneath said cutting mechanism for directing fruit dropping therefrom rearwardly through said frame into a receiving tube at the rear of said frame, said catcher having its lower end connected to the lower portions of said frame bars and its upper end projecting forwardly beyond the front portion of said cutting mechanism, the openwork formation of said catcher permitting said cutting mechanism to be seen by the user of the device when the pole is held in a perpendicular position.

2. The structure of claim 1 in which said fruit catcher has its lower end pivoted to said frame bars for compact folding against the front of said frame, and foldable braces connecting said frame bars to said catcher to hold the latter in its inclined position and to constitute side guards for said catcher.

3. The structure of claim 1 in which said fruit catcher comprises parallel side bars, an outer end bar connecting the outer ends of said side bars, spaced transverse wires extending between and secured to said side bars, and side guards extending from said side bars to said frame bars and serving to support the outer portion of said catcher.

4. The structure of claim 1 in which said fruit catcher includes parallel side bars and spaced wires extending between and secured to said side bars, together with a rectangular fruit-cushioning pad having at one end laterally-projecting, flexible tabs foldable downwardly and inwardly around said side bars between two of said wires when said pad lies on the lower portion of said catcher with the free end of the pad extending through said frame, and means for detachably connecting the folded ends of said tabs to the bottom of said pad.

5. The structure of claim 1 in which said cutting mechanism includes an inverted U-shaped member extending across the tops of said frame bars, the depending arms of said member being disposed in overlapping contact with the upper portions of said frame bars, transversely alined pivots connecting the lower ends of said arms to said frame bars to permit angular adjustment of said cutting mechanism with respect to said frame, and means for fastening said member in an adjusted position.

DORIS BARKSCHAT.

REFERENCES CITED

The following references are of record in the file of this patent:

UNITED STATES PATENTS

| Number | Name | Date |
|---|---|---|
| 60,249 | Roberts et al. | Dec. 4, 1866 |
| 782,754 | Merker | Feb. 14, 1905 |
| 810,344 | Pierce et al. | Jan. 16, 1906 |
| 1,100,965 | Farmer | June 23, 1914 |
| 1,191,954 | Elkins | July 25, 1916 |
| 1,214,450 | Gifford | Jan. 30, 1917 |
| 1,376,338 | Hysom | Apr. 26, 1921 |
| 1,390,760 | Charnoph | Sept. 13, 1921 |
| 1,709,640 | Wangerin | Apr. 16, 1929 |
| 2,225,119 | Kinkead | Dec. 17, 1940 |

FOREIGN PATENTS

| Number | Country | Date |
|---|---|---|
| 16,398 | Great Britain | July 9, 1914 |